(12) United States Patent
Wycech

(10) Patent No.: US 6,189,953 B1
(45) Date of Patent: Feb. 20, 2001

(54) REINFORCED STRUCTURAL ASSEMBLY

(75) Inventor: Joseph S. Wycech, Grosse Pointe Shores, MI (US)

(73) Assignee: Henkel Corporation, Gulph Mills, PA (US)

(*) Notice: Under 35 U.S.C. 154(b), the term of this patent shall be extended for 0 days.

(21) Appl. No.: 09/477,484

(22) Filed: Jan. 4, 2000

Related U.S. Application Data

(63) Continuation-in-part of application No. 09/236,917, filed on Jan. 25, 1999
(60) Provisional application No. 60/133,375, filed on May 10, 1999.

(51) Int. Cl.[7] .................................................. B62D 25/04
(52) U.S. Cl. ........................... 296/188; 296/30; 296/901; 296/209; 296/203.03; 428/35.9; 428/36.5; 428/36.91; 52/232; 52/735.1
(58) Field of Search .................... 296/188, 30, 146.6, 296/901, 189, 209, 203.03; 428/31, 304.1, 358, 35.9, 36.5, 36.91; 52/232, 309.8, 309.9, 735.1, 731.3

(56) References Cited

U.S. PATENT DOCUMENTS

| | | | |
|---|---|---|---|
| 4,751,249 | 6/1988 | Wycech | 521/54 |
| 4,836,516 | 6/1989 | Wycech | 267/279 |
| 4,853,270 | 8/1989 | Wycech | 428/68 |
| 4,861,097 | 8/1989 | Wycech | 296/188 |
| 4,923,902 | 5/1990 | Wycech | 521/54 |
| 4,978,562 | 12/1990 | Wycech | 428/35.8 |
| 5,124,186 | 6/1992 | Wycech | 428/38.8 |
| 5,213,391 | * 5/1993 | Takagi | 296/205 |
| 5,575,526 | 11/1996 | Wycech | 296/205 |
| 5,755,486 | 5/1998 | Wycech | 296/188 |
| 5,766,719 | 6/1998 | Rimkus | 428/71 |
| 5,884,960 | 3/1999 | Wycech | 296/146.6 |
| 5,888,600 | 3/1999 | Wycech | 428/35.9 |
| 5,992,923 | * 12/1999 | Wycech | 296/188 |
| 6,003,274 | * 12/1999 | Wycech | 296/188 X |

FOREIGN PATENT DOCUMENTS

| | | |
|---|---|---|
| 0891918A1 | 1/1999 | (EP) . |
| WO9743501 | 11/1997 | (WO) . |

* cited by examiner

Primary Examiner—Joseph D. Pape
(74) Attorney, Agent, or Firm—Wayne C. Jaeschke; Stephen D. Harper

(57) ABSTRACT

A stiffener is provided for reinforcing a hollow structure having a pair of spaced walls. The stiffener includes a carrier member with a layer of expandable polymer which creates a structural foam when the polymer is later expanded. The stiffener could comprise a single laminate shaped to fit in the appropriate locations of the hollow structure so that when the polymer is expanded it forms a structural foam intimately bonded to the pair of spaced walls. The stiffener may also be in the form of a corrugated frame wherein individual laminates are provided with notches to permit the individual laminates to be interlocked with each other at the notches.

4 Claims, 17 Drawing Sheets

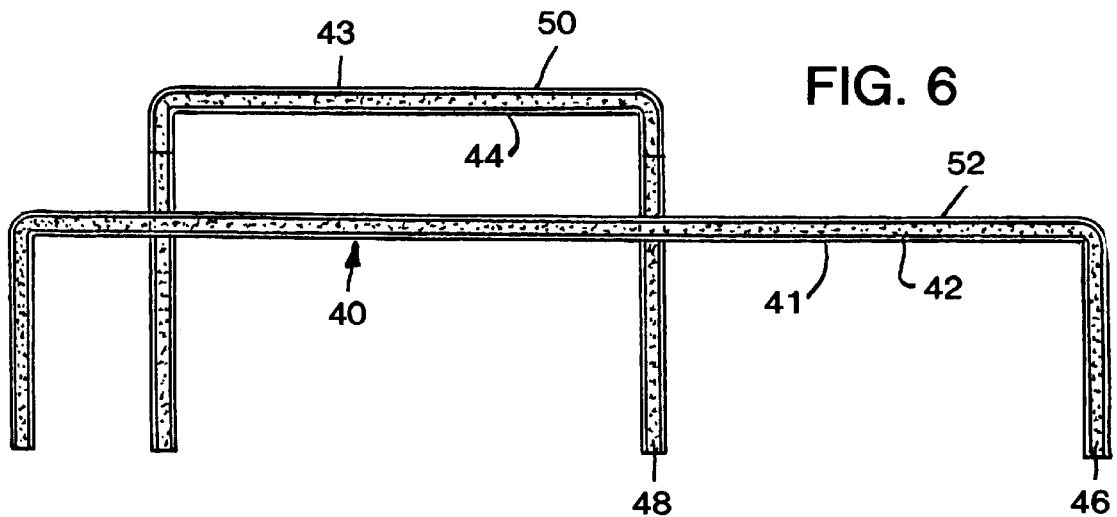
FIG. 6
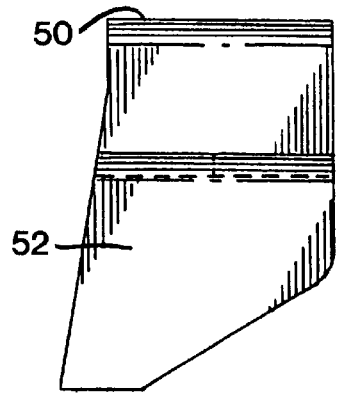
FIG. 7
FIG. 5
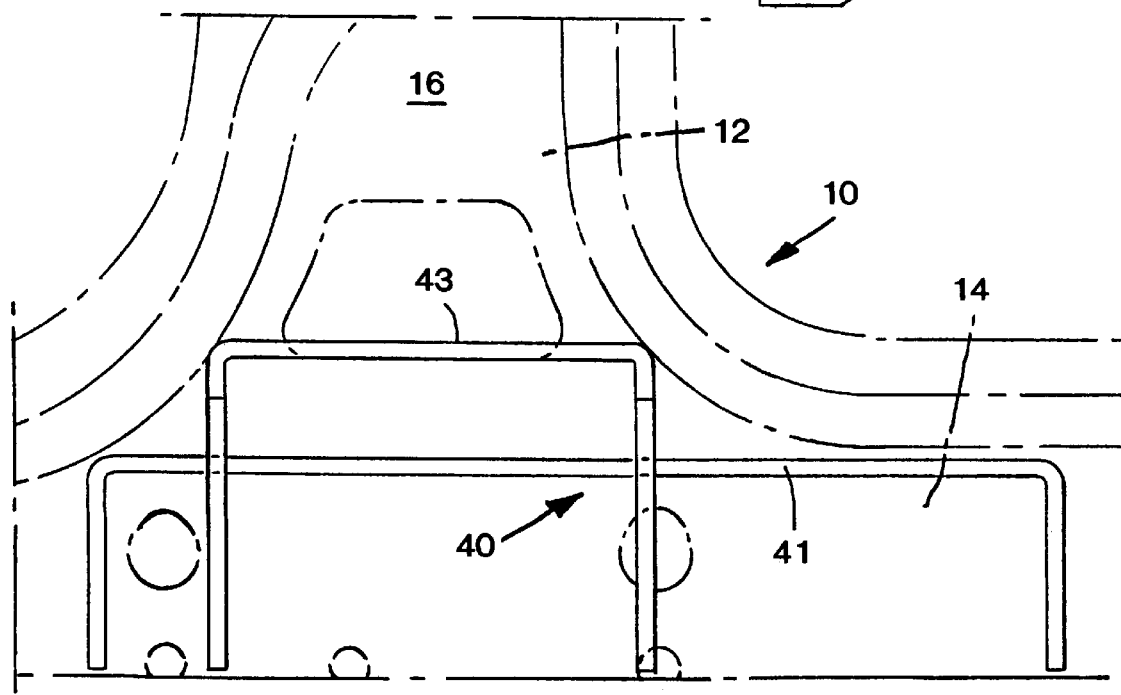

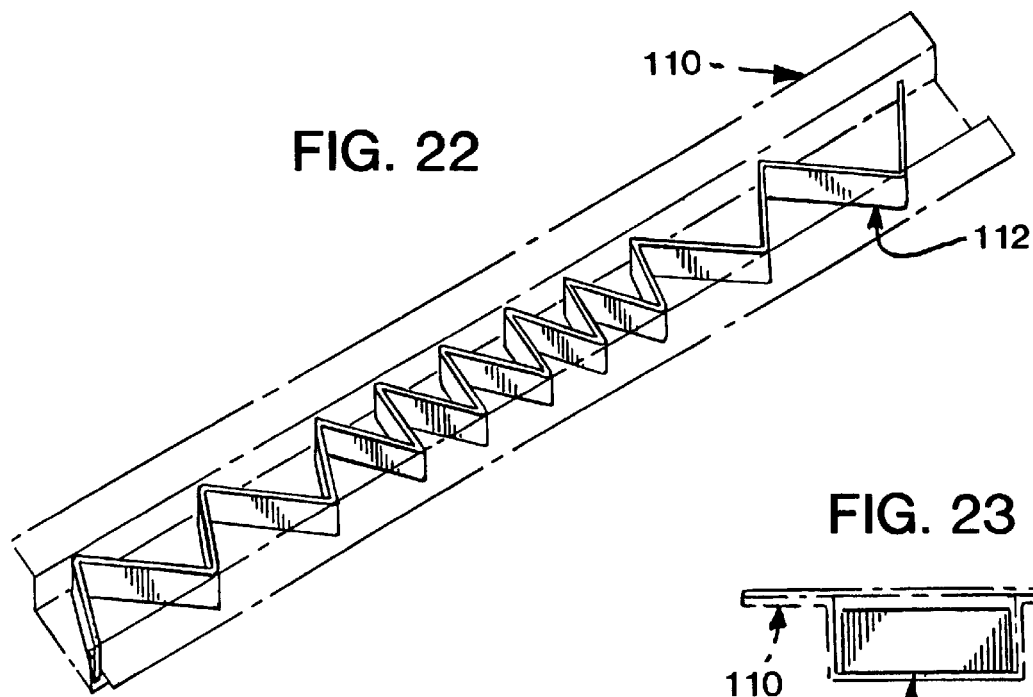
FIG. 22
FIG. 23
FIG. 25
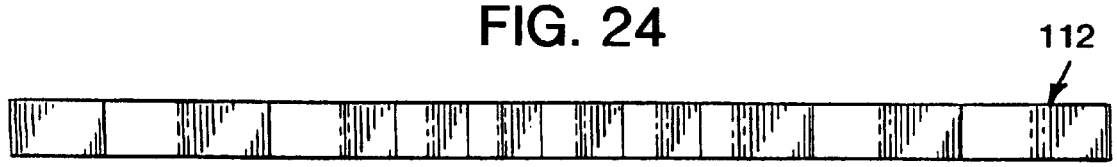
FIG. 24

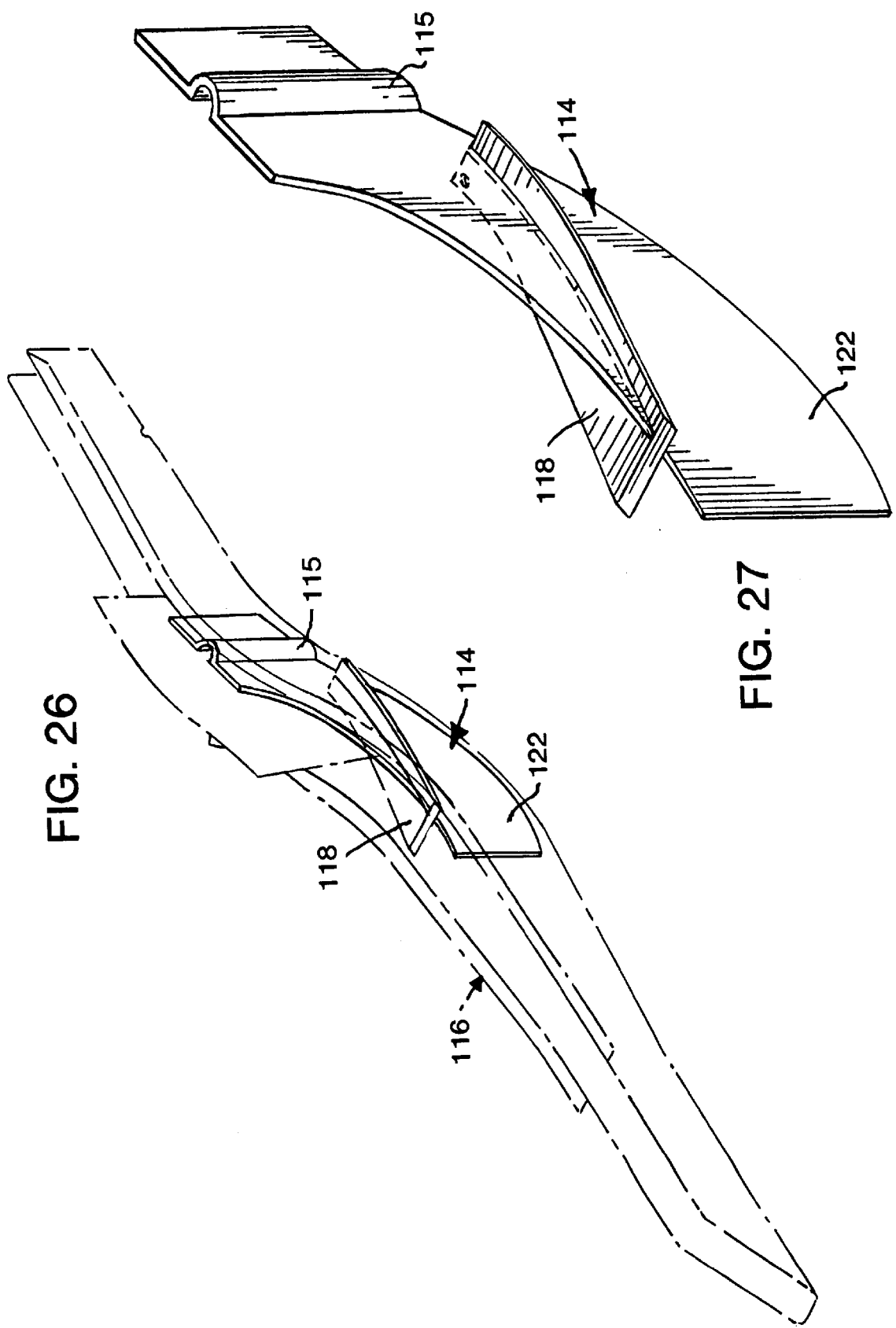

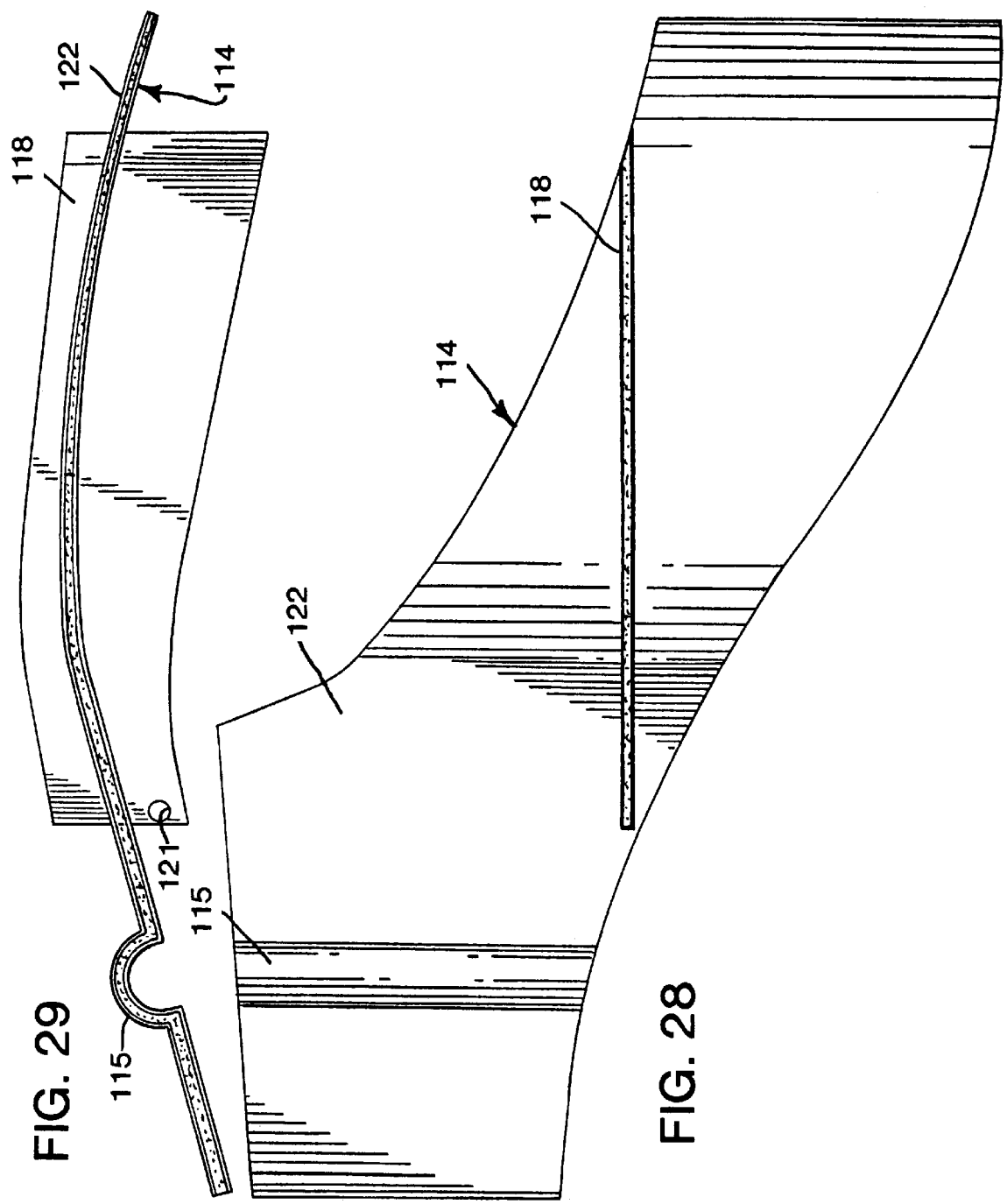

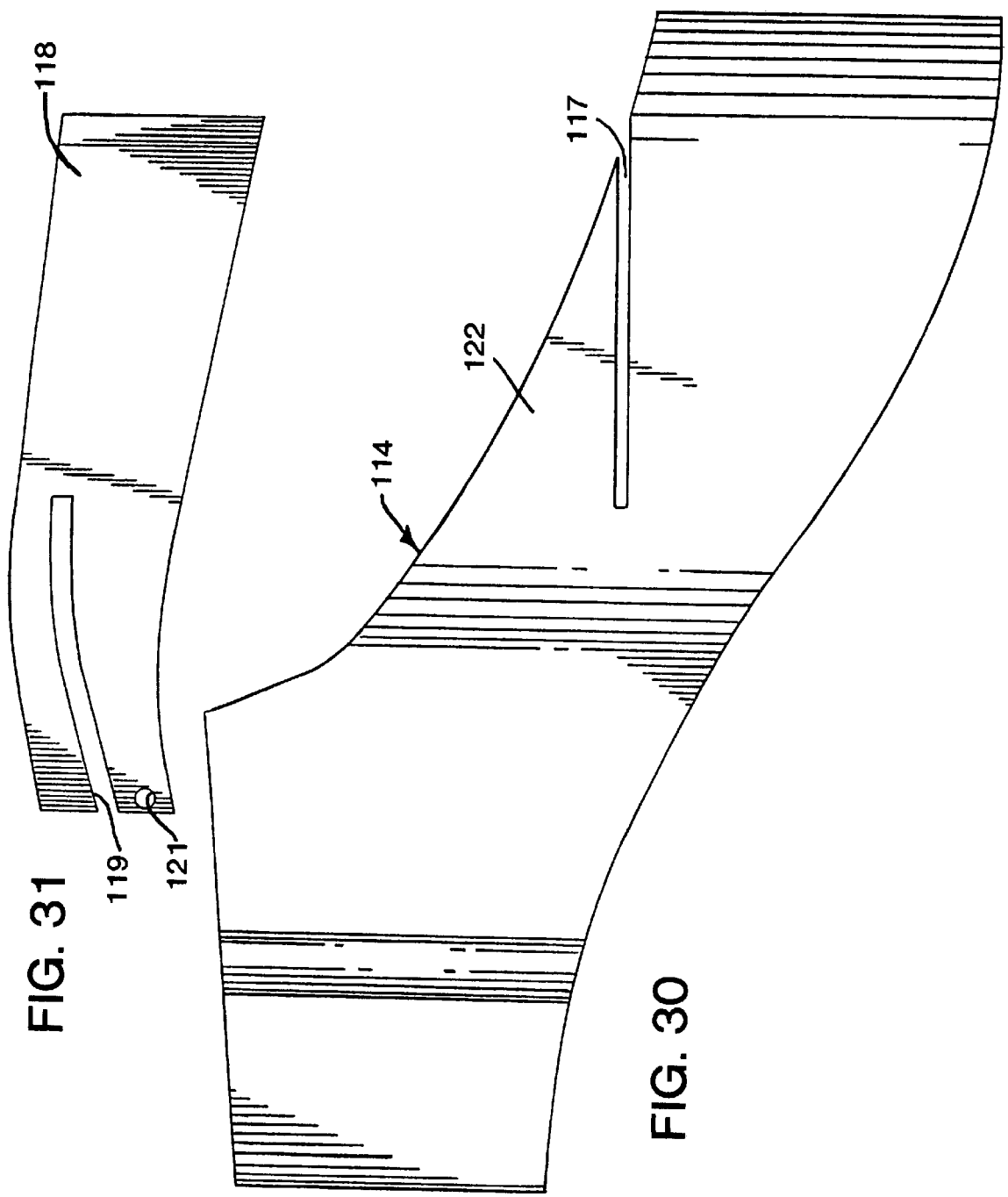

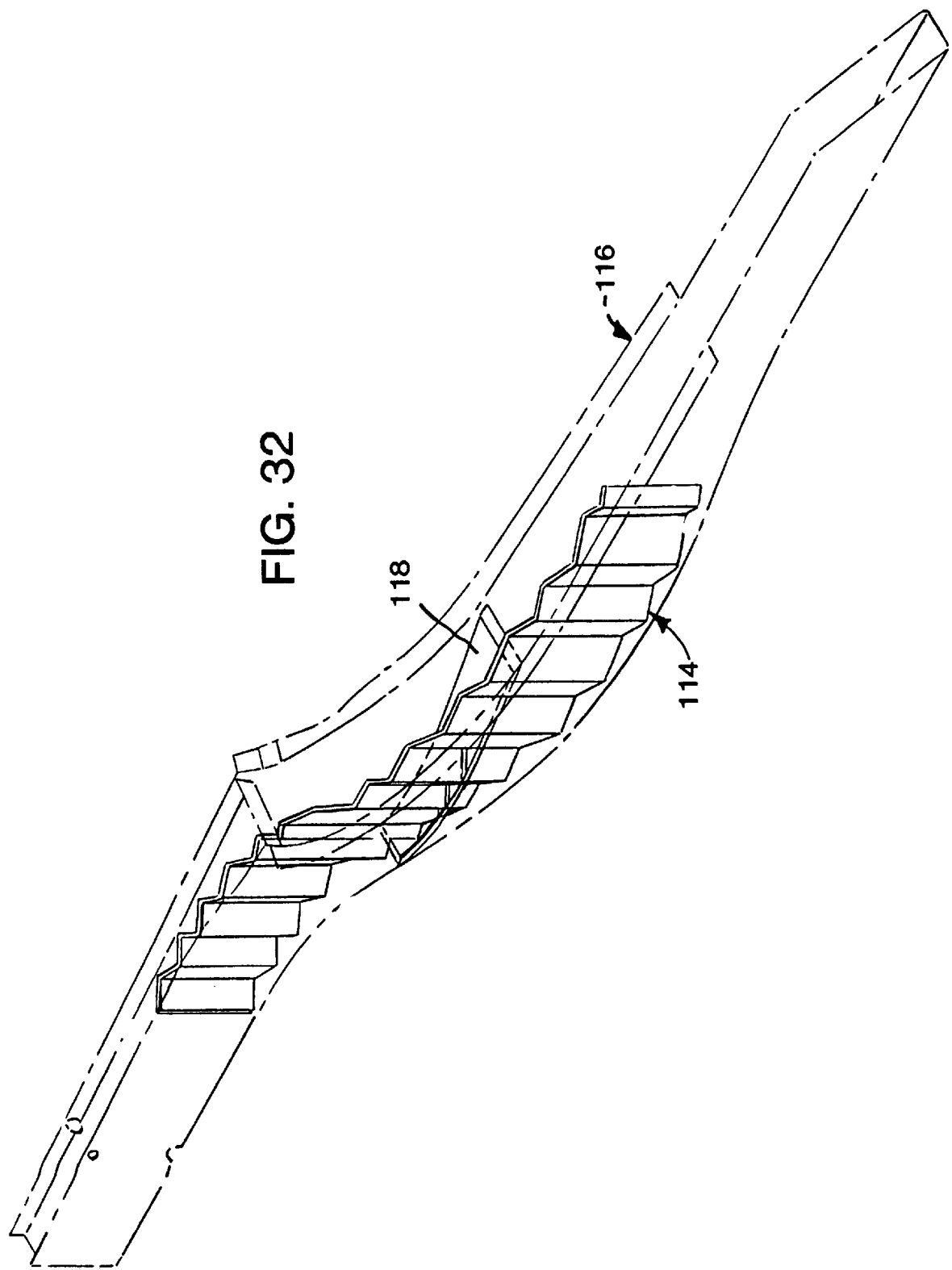

REINFORCED STRUCTURAL ASSEMBLY

CROSS-REFERENCE TO RELATED APPLICATION

This application is based upon provisional application Serial No. 60/133,375, filed May 10, 1999 and is a continuation in part of application Ser. No. 09/236,917, filed Jan. 25, 1999.

BACKGROUND OF THE INVENTION

In various practices it is desired to reinforce a hollow structural assembly, particularly structural members or sections which are subjected to edge or in-plane stresses which would tend to cause the structural member to buckle. Frequently holes are formed in structural members in order to weld internal reinforcements. Where, for example, the structural member is made of steel, a reinforcement is then welded to the structural member to prevent buckling. The holes would then be covered with cloth or plastic for appearance purposes.

It would be desirable if such hollow structural members could be reinforced by placing a reinforcement insert assembly into the hollow structure between the spaced walls in such a manner that would avoid the above problem. Typical applications for such practices could be in the automotive field, such as for reinforcing pillars. Other practices could be in the furniture field, such as for office furniture end shelving units where shelves are locked into vertical end walls or panels.

SUMMARY OF THE INVENTION

An object of this invention is to provide a reinforced structural assembly which meets the above needs.

A further object of this invention is to provide such a reinforced structural assembly which includes a stiffener capable of being readily placed into the assembly.

A still further object of this invention is to provide techniques for reinforcing a structural assembly.

A further object of this invention is to provide such practices which could be used for various applications, such as in the automotive field or in the furniture reinforcement field.

In accordance with one embodiment of this invention a stiffener is formed by interconnecting sets of laminates. Each laminate preferably comprises a carrier member and a cover member with an expandable polymer layer between the members. Preferably the polymer is heat curable. Each laminate contains notches so that the laminates can be interlocked to form a corrugated frame or lattice which may be inserted into a hollow structure. Upon curing and expansion of the polymer a structural foam results which is intimately bonded to the spaced side walls of the hollow structure. The hollow structure may, for example, be a pillar in an automobile or could be a hollow panel of a shelving unit.

In an alternative practice of the invention the stiffener could comprise an inverted U connected to an upstanding U with a common leg. An outward leg at one end of the laminate may extend upwardly beyond the remainder of the laminate so that the laminate could be placed in a lower pillar of a car at the junction of a hollow vertical section with a hollow horizontal section of the pillar for side impact or joint stiffening.

In a further alternative practice of the invention where the stiffener is a drop in insert for reinforcing a shelving unit, such as an office furniture end shelving unit. The laminate may be of straight linear construction and simply dropped into the unit so that the laminate extends generally from top to bottom of the hollow panel of the unit. In a variation the stiffener could be bent such as to form a generally zig-zag shape.

BRIEF DESCRIPTION OF THE DRAWINGS

FIG. 5 is a view similar to FIG. 1 of an alternative form of stiffener;

FIG. 6 is a side elevational view of the stiffener shown in FIG. 5;

FIG. 7 is an end elevational view of the stiffener shown in FIGS. 5–6;

FIG. 22 is a perspective view of a reinforced structural member in accordance with yet another practice of this invention;

FIG. 23 is an enlarged end elevational view of the structure shown in FIG. 22;

FIG. 24 is a side elevational view of the reinforcement insert shown in FIGS. 22–23;

FIG. 25 is a top plan view of the reinforcement insert shown in FIG. 24;

FIG. 26 is a perspective view of a reinforced structural member in accordance with an alternative practice of this invention;

FIG. 27 is a perspective view of the reinforcement insert shown in FIG. 26;

FIG. 28 is a side elevational view of the reinforcement insert shown in FIGS. 26–27;

FIG. 29 is a top plan view of the reinforcement insert shown in FIGS. 26–28;

FIG. 30 is a side elevational view of one of the components of the reinforcement insert shown in FIGS. 26–29;

FIG. 31 is a top plan view of the other of the components of the reinforcement insert shown in FIGS. 26–29;

FIG. 32 is a perspective view similar to FIG. 26 of yet another practice of this invention;

DETAILED DESCRIPTION

The present invention relates to techniques for reinforcing a hollow structural member having a pair of spaced walls so as to prevent buckling. In general, the techniques include providing a stiffener in the form of a carrier member having a layer of expandable polymer so that the stiffener can be readily disposed within the hollow structure between the spaced walls. The polymer is disposed for contacting the spaced walls when the polymer is expanded into a rigid structural foam. As will later be described, the stiffener can take various forms so as to maximize the reinforcing ability and the convenience of assembly of the stiffener.

Figure 1:
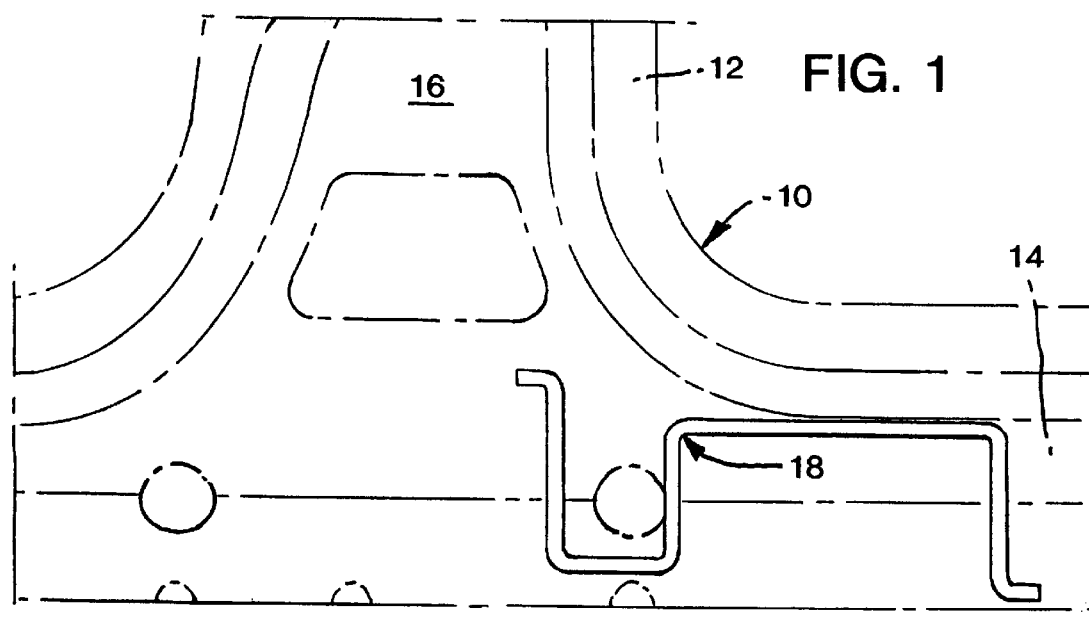
FIG. 1 is a partial side elevational view showing a door frame lower B pillar of an automobile with a stiffener mounted in place.

FIG. 1 illustrates a portion of a lower B pillar for an automobile door frame. The B pillar 10 includes a hollow frame having a generally vertical portion 12 joined to a generally horizontal portion 14. It would be desirable to reinforce the pillar at the junction of the vertical and horizontal portions and particularly to provide the reinforcement so as to interconnect the opposite side walls of the pillar 10 for side impact or joint stiffening. One of the side walls 16 is illustrated. The other side wall would be parallel to and spaced from the illustrated side wall and would have generally the same configuration.

Figure 4:
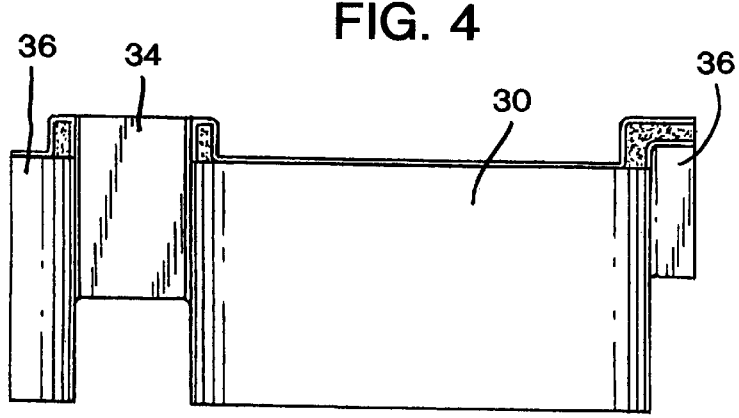
FIG. 4 is a perspective view of the stiffener shown in FIGS. 1–3.
Figure 2:
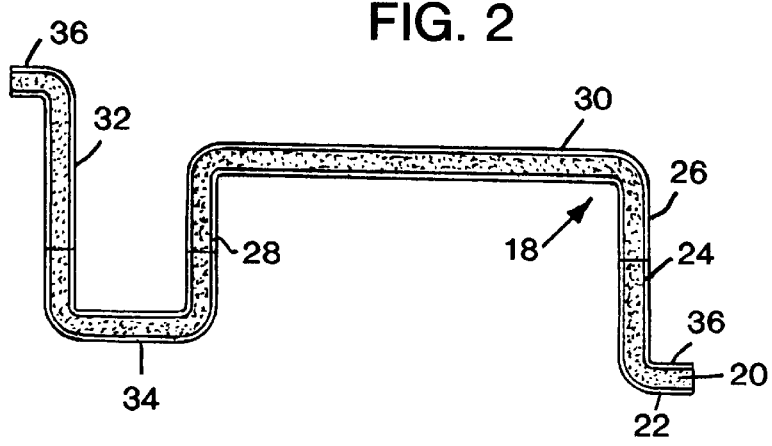
FIG. 2 is a side elevational view of the stiffener shown in FIG. 1.
Figure 3:
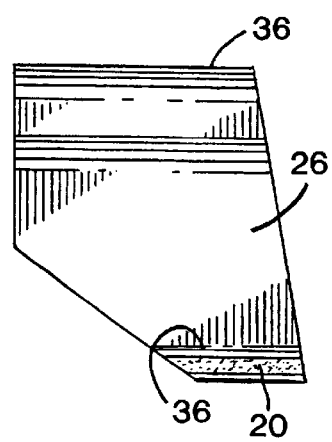
FIG. 3 is a right end elevational view of the stiffener shown in FIGS. 1–2.

As shown in FIG. 1 a stiffener is located within the hollow structure of pillar 10. FIGS. 2–4 best illustrate the details of stiffener 18. As shown therein a layer of polymer 20 is sandwiched between two support layers 22,24 to form a trilaminate. One of the layers, such as layer 22, would function as a carrier member while the other layer 24 would function as a cover member. Preferably, the layers 22,24 are made of metal, plastic or fiberglass material and preferably are rigid. The polymer layer 20 is preferably made of an expandable resin which upon expansion forms a structural foam or reinforcement that becomes intimately bonded not only to its carrier and cover members 22,24, but also to the spaced walls 16 of the hollow structure 10.

Although stiffener 18 may take any suitable shape, it is preferred to form the stiffener with a non-planar shape that provides for added height where the vertical portion 12 of pillar 10 meets the horizontal portion 14 and to provide greater length within the horizontal portion itself. By having a non-planar or bent structure it is also possible to take into account the location of holes or any objects that might be within the pillar 10.

In the embodiment shown in FIGS. 1–4 the stiffener 18 is in the form of an upstanding U connected to an inverted U. The inverted U has a vertical leg 26 and an opposite vertical leg 28 interconnected by intermediate horizontal portion 30. The upstanding U has a vertical leg 32 and shares the common leg 28. Legs 28 and 32 are interconnected by horizontal portion 34. Each of the remote or outward legs 24,32 terminates in an outwardly extending flange 36. In this manner, the vertical leg 32 extends upwardly into the vertical portion 12 of the pillar while the horizontal connecting portion 30 and the vertical leg 24 extend outwardly into the horizontal portion 14 of pillar 10. Flange 36 extending from leg 24 also extends below connecting portion 34 as best seen in FIGS. 1–2.

Although FIGS. 1–4 illustrate a stiffener to have a double U shape, such shape may also be incorporated in other forms such as a W or M or U or V form.

Any suitable materials may be used for the polymer layer 20 and for layers 22 and 36. Reference is made to U.S. Pat. Nos. 5,575,526 and 5,755,486, as well as application Ser. No. 08/675,173 filed Jul. 3, 1996, all of the details of which are incorporated herein by reference thereto. It is preferable to use thin metal layers of sheet/foil thickness for the carrier member 22 and cover member 24. Plastic or fiberglass could also be used. It is also preferable to use a heat expandable resin for the polymer layer 20 which creates the structural reinforcement foam upon curing and expansion. Where the invention is used in an assembly line during vehicle production, the heating step could be accomplished in an oven conventionally used in such assembly lines without requiring a special added heating step. It is to be understood, however, that the invention may also be practiced where, for example, the resin is chemically cured in order to cause expansion.

FIGS. 5–8 illustrate a preferred variation of the invention wherein the stiffener 40 is made of a plurality of components which are interconnected to form a corrugated frame or lattice. FIG. 6, for example, illustrates the stiffener 40 to comprise a pair of laminates 41 and 43. The laminates include U-shaped carriers 42,44 each of which has a layer 46,48 of polymer in its unexpanded condition similar to polymer 20. Preferably, a cover member 50,52 is provided over the polymer similar to the unit 18 described in FIGS. 1–4.

Figure 8:
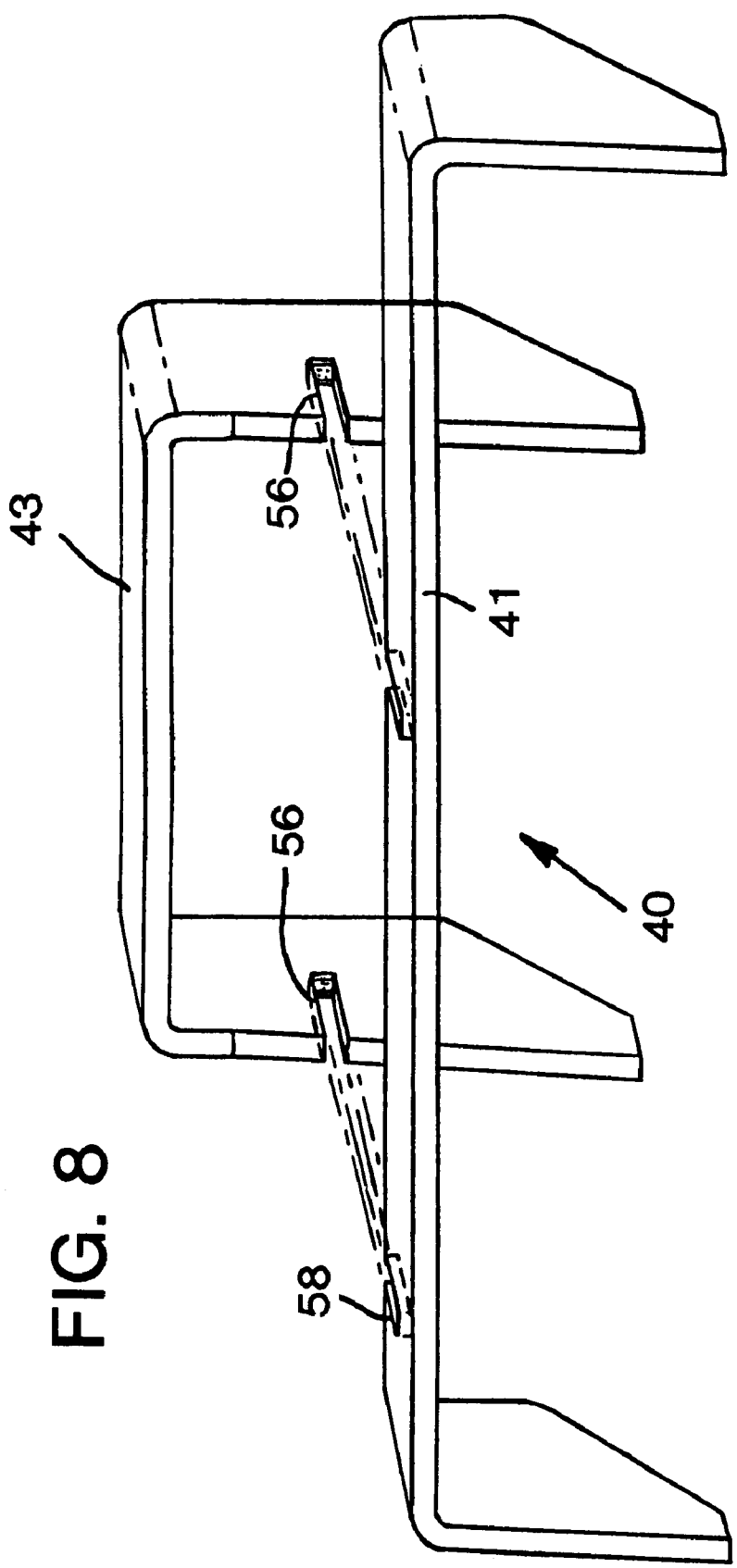
FIG. 8 is a perspective exploded view of the stiffener shown in FIGS. 5–7.
Figure 10:
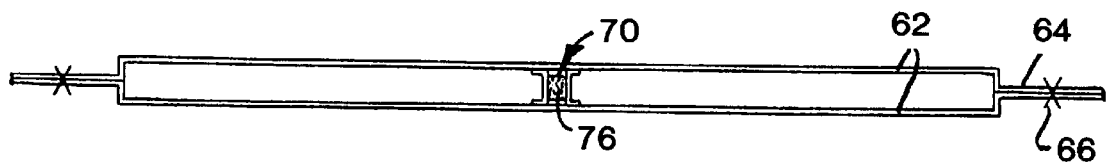
FIG. 10 is a top plan view of the panel shown in FIG. 9.

As shown in FIG. 8 each U-shaped laminate 41,43 includes a notch or cutout 56,58 at a connecting portion of the laminate so that the two laminates 41 and 43 may be interconnected by aligning the notches and then moving the two laminates together. The laminates 41 and 43 are of equal width, particularly at the connecting portions. Preferably, the combined length of the two notches 56,58 is equal to the width of each laminate at the connecting portion so that when the two laminates are interconnected, neither of the laminates extends outwardly of the other laminate. In other words, the front faces or walls of the two laminates are coplanar as are the rear faces or walls. Preferably, each notch extends about half-way into its respective laminate. Each notch has a width of 7.6 mm.

The corrugated frame 40 would be placed in a hollow structure such as the pillar 10. The laminate 41 extends into the horizontal portion 14 of pillar 10, while the laminate 43 extends upwardly into the vertical portion 12 of pillar 10. Upon curing and expansion of the polymer 46,48, the resultant structural foam is intimately bonded to the pair of spaced walls 16 of pillar 10.

Stiffener 18 or 40 may be placed in the pillar in any suitable manner such as by being mounted in place before the two walls 16,16 are secured together. The result of incorporating the reinforcement unit in the pillar is to provide a side impact reinforcement or joint stiffening which would be desirable for such structural member.

An example of use for the stiffener in automobiles would be to reinforce a rocker for a lower B pillar and the rear door of an automobile for side impact.

Figure 11:
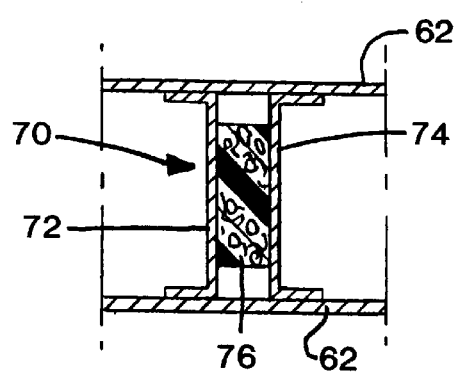
FIG. 11 is a cross-sectional view taken through FIG. 9 along the line 11—11.
Figure 12:
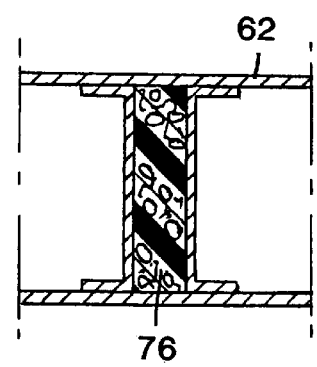
FIG. 12 is a view similar to FIG. 11 showing the stiffener after expansion of the foam.
Figure 14:
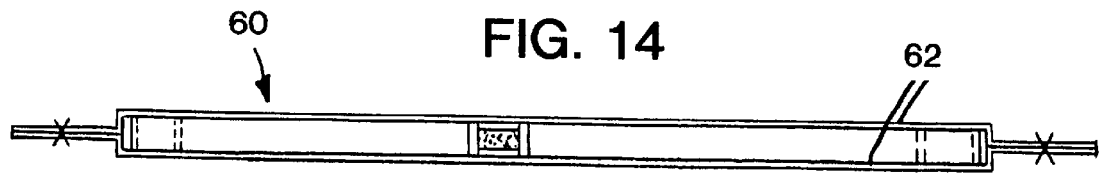
FIG. 14 is a top plan view of the panel shown in FIG. 13.
Figure 13:
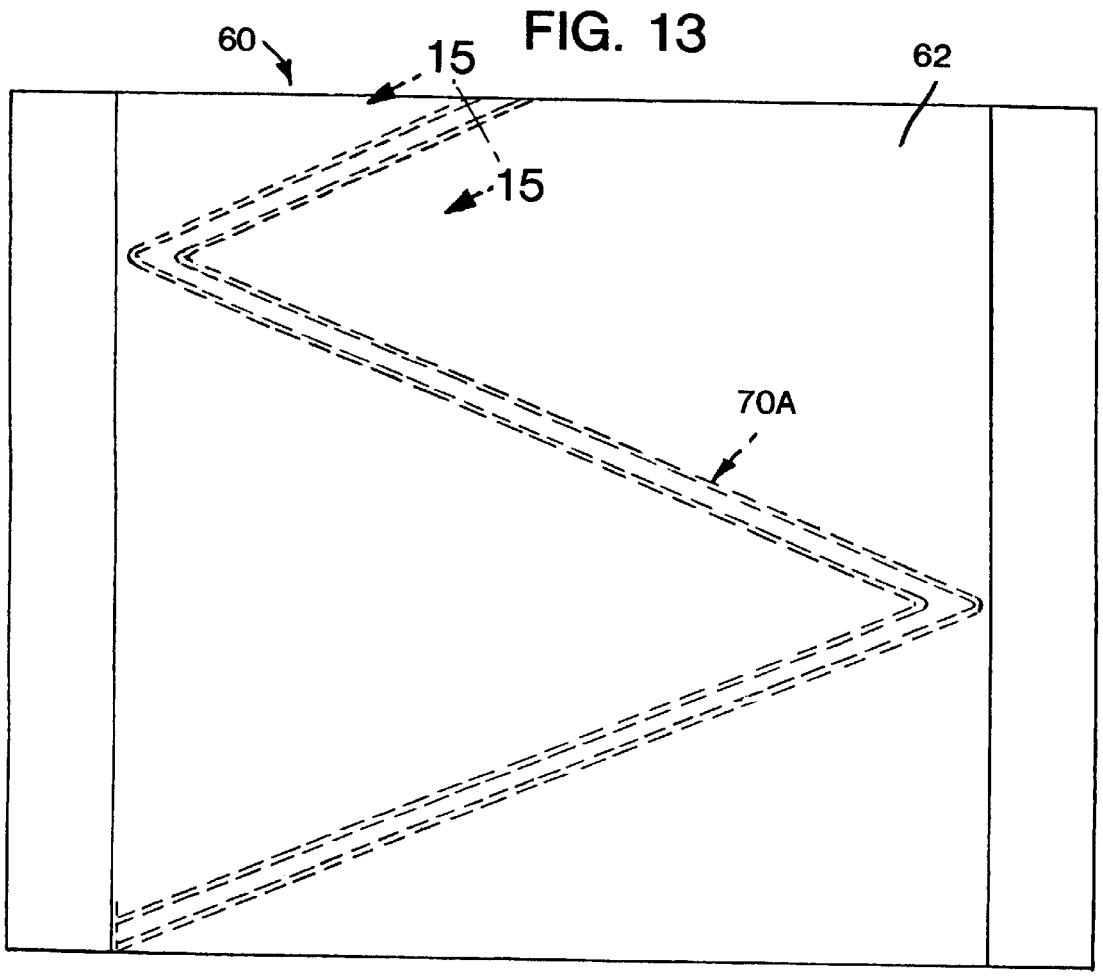
FIG. 13 is a view similar to FIG. 9 of a panel having an alternative view of stiffener in accordance with this invention.
Figure 15:
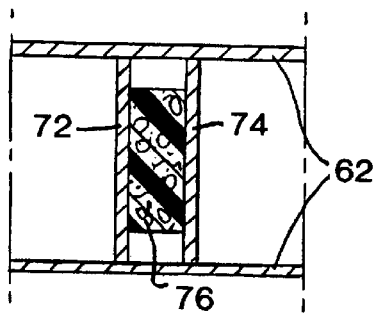
FIG. 15 is a cross-sectional view taken through FIG. 13 along the line 15—15.
Figure 16:
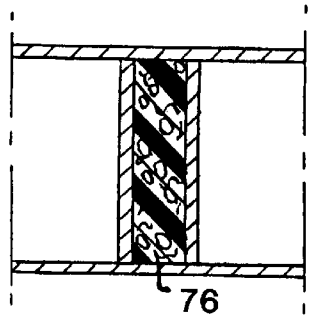
FIG. 16 is a view similar to FIG. 15 showing the foam in its expanded condition.

While the invention illustrated in FIGS. 1–8 has been described with respect to its practice in the automotive industry as a reinforcement for hollow structures, the invention may also be practiced in other fields. FIGS. 9–12, for example, illustrate the use of the invention in a hollow panel or side wall 60 which is part of a shelving unit wherein shelves are locked into the end walls of the end unit. As illustrated, panel 60 has a pair of spaced walls 62,62 forming a hollow cavity between the walls. The edges of the walls may be secured together at their flanges 64 by any suitable means such as spot welds 66. Disposed within the hollow space between the walls is a stiffener 70. As shown in FIG. 11 stiffener 70 is a drop in insert which comprises a pair of spaced support members 72,74, similar to the carrier member and cover member of the stiffeners 18 and 40 and which are in contact with walls 62,62. Between the members 72,74 is a polymer layer 76, which is shown in FIG. 11 in its unexpanded condition. Upon curing and expansion of the polymer, the resultant structural foam expands into intimate contact with the walls 62,62 as illustrated in FIG. 12.

Stiffener 70 could be mounted in the hollow space between walls 62,62 in any suitable manner. Preferably, the stiffener 70 could simply be dropped in from the top before any cap closes the top of the hollow space between walls 62,62.

Figure 9:
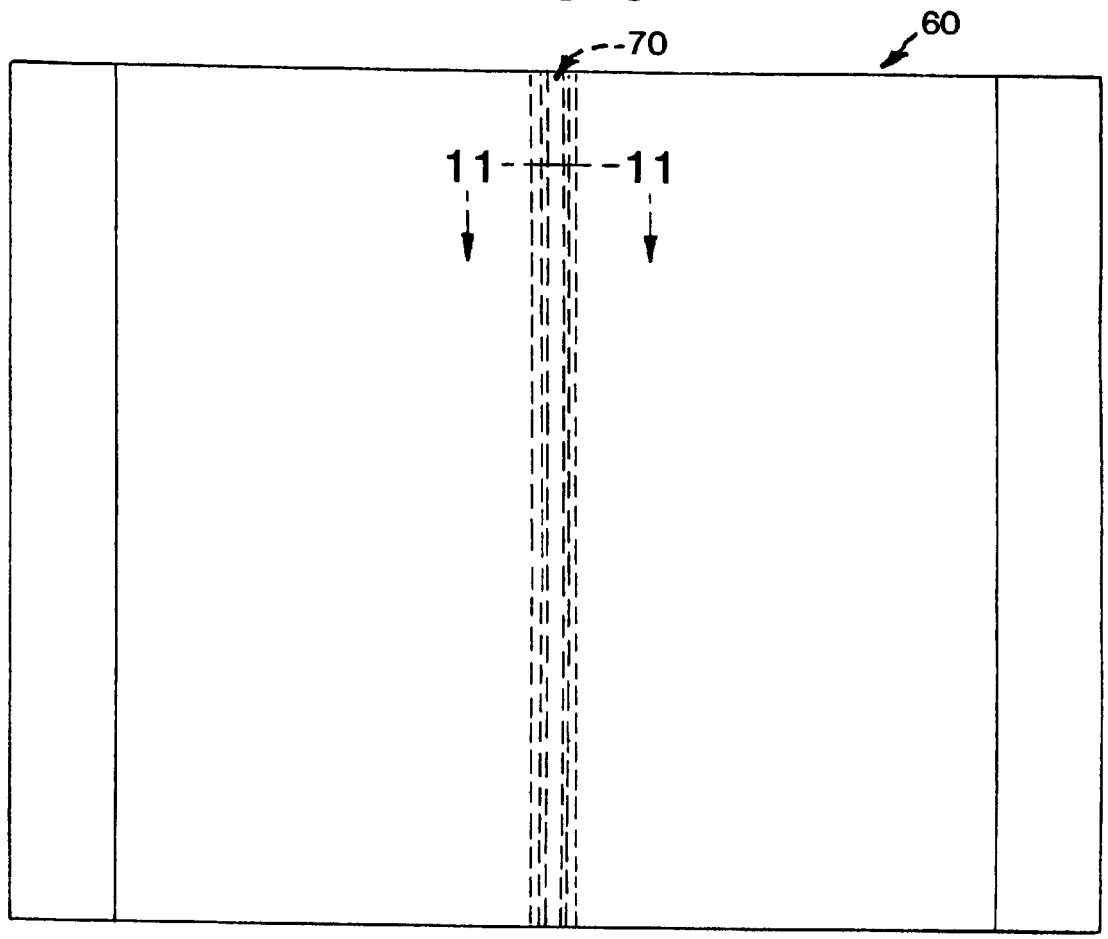
FIG. 9 is a front elevational view of a reinforced panel in an office furniture end shelving unit incorporating a stiffener in accordance with another alternative of this invention.

As shown in FIG. 9 the stiffener 70 is generally of a straight linear configuration in that it extends directly from one end to the other of the panel 60 in a straight path. If desired, a plurality of parallel spaced stiffeners 70 may be mounted between walls 62,62.

FIGS. 13–16 show a variation wherein the stiffener 70A is not a straight member, but rather is shaped or bent in a zig zag type manner. This version provides reinforcement over a greater area between the walls 62,62 as compared to the straight structure 70.

Figure 18:
FIG. 18 is a top plan view of the panel shown in FIG. 17.
Figure 17:
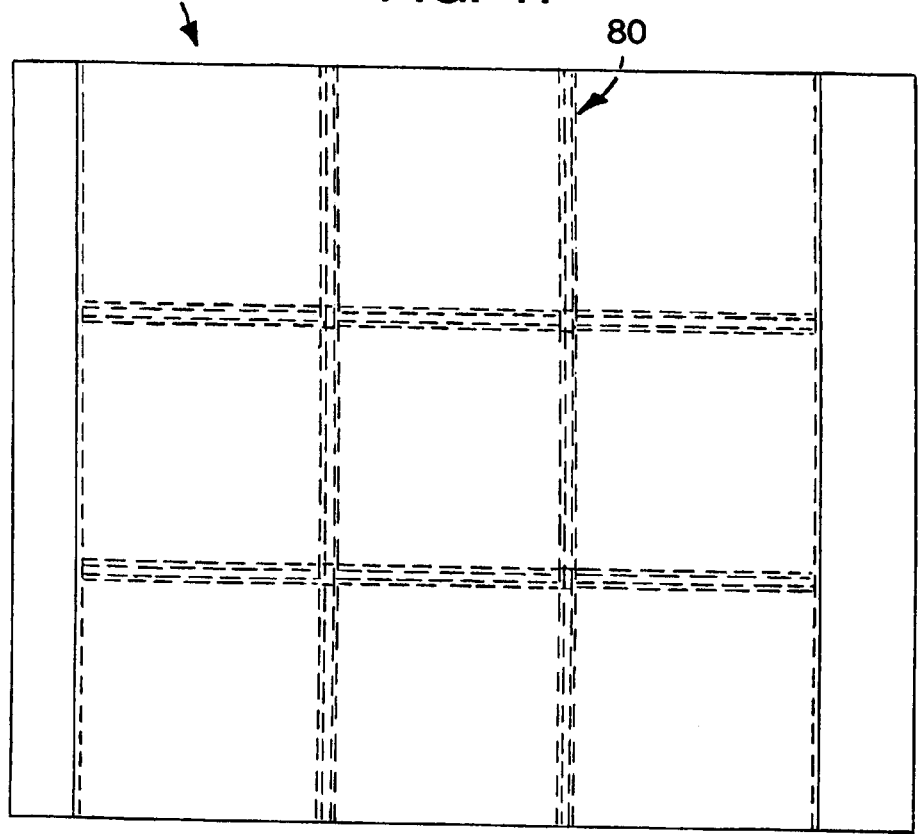
FIG. 17 is a front elevational view of a reinforced panel for a shelving unit in accordance with still a further embodiment of this invention.
Figure 19:
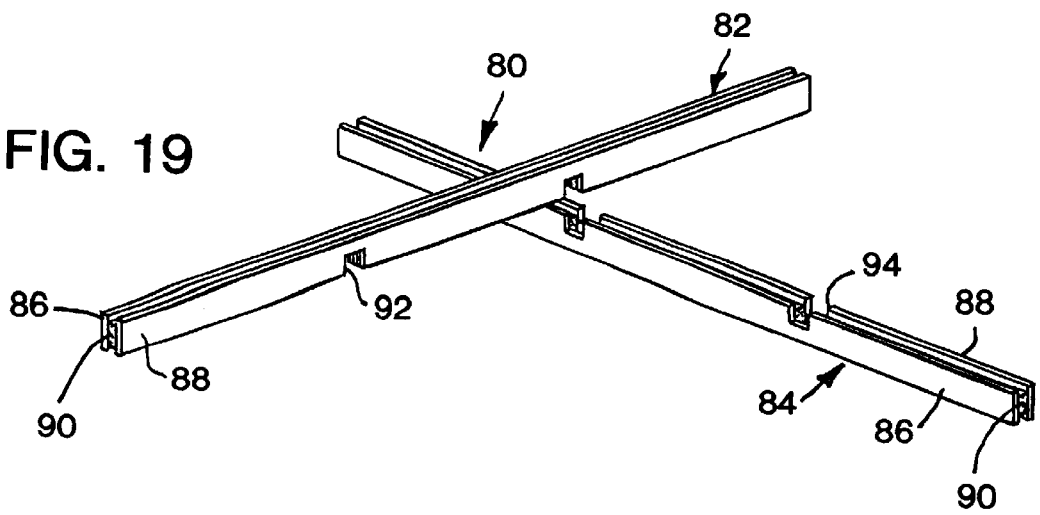
FIG. 19 is a perspective exploded view of a portion of the stiffener shown in FIGS. 17–18.

FIGS. 17–19 illustrate a preferred variation of the stiffener which is constructed along the same lines as the stiffener 40 in that a plurality of laminates are interconnected to form a corrugated frame or lattice. As illustrated, the stiffener 80 comprises a plurality of first laminates 82 and a plurality of second laminates 84 which extend crosswise the laminates 82. Each laminate comprises a pair of support members 86,88 between which is sandwiched the polymer 90 in the manner previously described. The members 86,88 may thus be considered as a carrier member and a cover member for the polymer layer. Laminate 82 is provided with a plurality of notches 92 to mate with the corresponding notches 94 in laminate 84. Preferably, the combined length of each set of interlocking notches would be equal to the width of each laminate so that the resultant corrugated frame is of uniform thickness in that the laminates terminate coplanar with each other. FIGS. 17–18 show the placement of the corrugated frame 80 between the walls 62,62 of panel 60.

Although the various corrugated stiffeners illustrated herein show the interconnected laminates to be perpendicular to each other it is to be understood that the invention may also be practiced where the laminates are at a non-perpendicular angle with respect to each other. In such practices, the notches would preferably extend at an angle across each laminate.

The corrugated frame can readily be dropped in through the open top of the panel 60 or trapped between the panels during assembly and act as a brace which, because of its open areas, could be shaped to avoid holes and accommodate any irregularities in the panel.

In the various embodiments, the carrier member and cover member each may be made, for example, of 0.8 mm of galvaneal steel. The polymer layer before curing may be a strip of polymer 6 mm by 75% of the spacing between the walls. The spacing between the walls 62,62 may be 25.4 mm. The carrier and cover members may be 0.8 mm thick.

As previously described, the preferred practice of the invention consists of a three layer reinforcement made up from two outer layers of metal, plastic, or fiberglass and an inner layer of heat curable polymer. The inner layer would be extruded onto one of the outer layers in a continuous fashion and the other outer layer would be rolled on top of the inner polymer layer. The sandwich would then be sent through a set of roll formers or pinch rollers, notched or trimmed, and then cut to length. The use of pinch rollers or a set of roll formers for the polymer and support member (one layer or two layers) shapes a cross section in a continuous manner for the laminate before being cut to length. Alternatively, the polymer and support member could be stamped to its desired shape by means of a chilled stamping die. The support member acts to assist in maintaining part shape and the cooling of the polymer layer in the stamping die or by ambient or chilled air in the roll forming process also "sets" the part shape. The coincidental forming of the polymer and support member at the same time differs from the current process which involves the separate forming of the polymer layer and support member and then hand placement of the polymer layer onto the carrier/support member.

Separate pieces would be notched (if appropriate) and cut to length whereby one trilaminate snaps into another trilaminate such that a residential window grill or corrugated carton partition is formed. FIG. 19 shows the simplest configuration which could be used for an office furniture end shelving unit. See FIG. 17. FIGS. 6–8 shows this approach for a lower B pillar of a car for side impact or joint stiffening.

In the practice of the invention the two outer layers are rigid enough to support the diaphragms or stiffeners such that they retain their shape during forming, handling, and heat curing of the inner polymer layer and that they constrain the polymer such that the polymer expands in the plane of the laminate and consequently bonds to the walls of the hollow section to be reinforced. The interlocking nature of laminates allows for internal, self-supporting bulkheads to be placed in key areas of the hollow sections such that premature buckling of the parent or main hollow sections does not take place under applied loads.

A trilaminate is preferably formed by an in-line extrusion roll forming process such that trimmed, bent, notched, and cut lengths can be fabricated into interlocking support shapes. The interlocking sections whether they be straight or bent can be used to reinforce hollow sections in key or critical areas thereby minimizing material usage through effective placement of the interlocking bulkheads or diaphragms. This approach lends itself to application in difficult areas to be reinforced. The interlocking laminates prevent thin section wall buckling due to wall stresses caused by bending or axial loading. Also, another important feature is that the two outside laminate skins or layers constrain the polymer towards bonding one side of the section to the other plus bonding the laminate layers to themselves. The interlocking trilaminate is another means of tying the side walls of a thin gage section together apart from filling a section solid with foam or lining the interior walls of a hollow section with a polymer laminate.

In practice, when forming the various stiffeners, a layer of polymer resin would be extruded onto the carrier member. In the broad practice of the invention the unit could include a laminate structure comprising only the carrier member and layer of resin. In the preferred practice, however, the cover member is added on the exposed side of the resin layer to sandwich the layer between the two support members. By having two support members the polymer is constrained and upon expansion of the foam the members direct the foam into bonding contact with the thin walls of the hollow structure. Where the stiffener is formed in an in line process the laminate structure would then be chilled at, for example, a temperature in the range of 0° to –40° F. After chilling any necessary trimming or notching could be done using any suitable techniques such as die cutting or the application of a water jet. The laminate would then be cut to length and where necessary would be bent to its desired shape. Where the unit is a corrugated frame the individual laminates would then be interlocked with each other at the notches formed in the connecting portions of the laminate.

Figure 20:
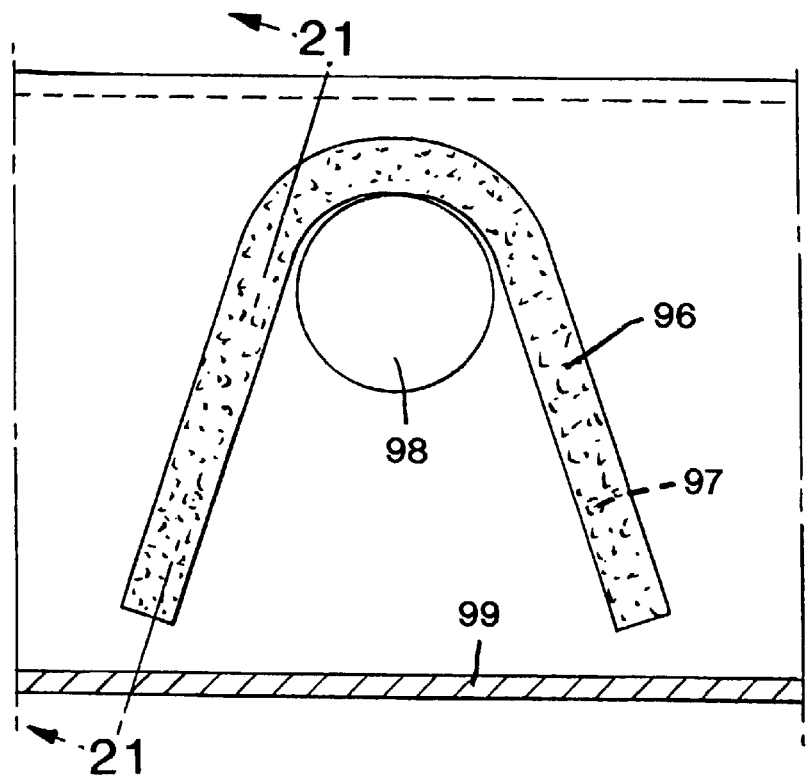
FIG. 20 is an elevational view of yet another practice of this invention.
Figure 21:
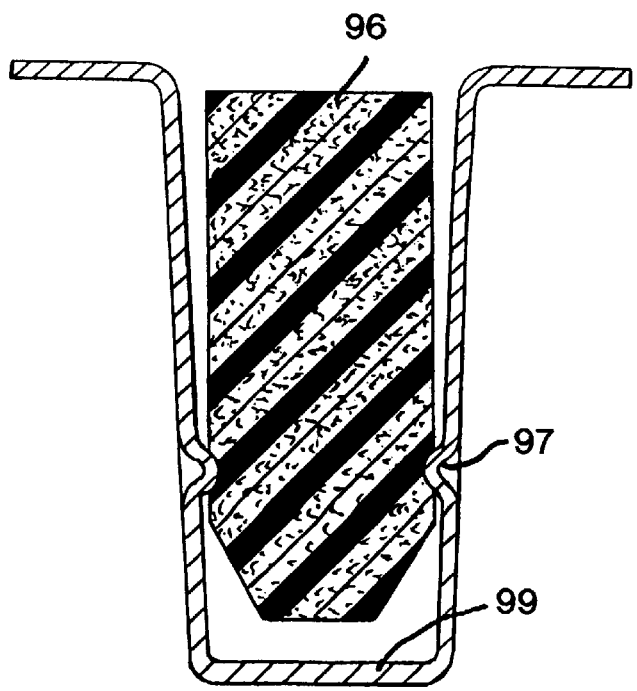
FIG. 21 is a cross-sectional view taken through FIG. 20 along the line 21—21.
Figure 33:
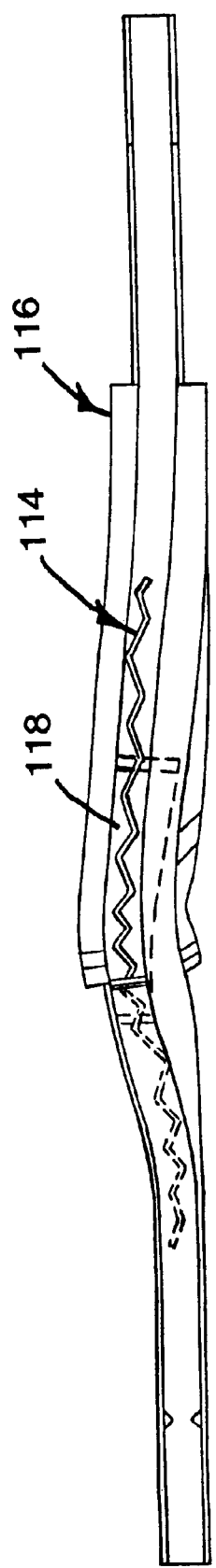
FIG. 33 is a top plan view of the structure shown in FIG. 32.

FIGS. 20–21 show a variation of the invention. As shown therein, the trilaminate stiffener 96 is in the shape of a horseshoe placed over the pin 98 and seated on the bottom of the rail 99. Rail 99 may include dimples 97 which penetrate the foam layer to hold the stiffener 96 in place. Preferably the stiffener 96 is made in-line, extruded, die cut in its flat condition and then bent to the final profile.

As is apparent one aspect of the invention involves a stiffener for reinforcing a hollow structure having a pair of spaced walls. The stiffener comprises a carrier member with a layer of expandable polymer on the carrier member and a cover member on the polymer layer. The stiffener is of non-linear shape, such as a W, M, U or V shape or some other irregular shape.

FIGS. 22–47 relate to variations of the previously described techniques. In the following description reference will be made to various structural arrangements and materials. It is to be understood that these details are considered exemplary of various practices of the invention and that the various shapes, relationships and materials disclosed in prior practices may also be utilized in the various practices of FIGS. 22–47.

FIGS. 22–25 illustrate one practice of this invention which involves the reinforcement of a channel shaped structural member 110 by means of a drop in reinforcement insert 112. In the illustrated embodiment structural member 110 is a truck pickup floor beam. Reinforcement insert 112 is in the form of a convoluted trilaminate which functions as an internal spacer to maintain the cross sections during gross beam deflection. This approach is similar to the convoluted trilaminate previously described, particularly for furniture application except that in the prior embodiment the trilaminate is loaded in tension in the narrow direction. In the embodiment illustrated in FIGS. 22–23, for the pickup beam, for example, the trilaminate reinforcement 112 is loaded in compression in the short or narrow direction. The trilaminate would comprise a central layer 111 of structural foam with an outer layer 113 functioning as a carrier and/or cover or support layer on each side of the structural foam as described in the prior application.

As illustrated the convoluted shape need not be uniform in its degree of convolution. Thus, for example, the central portion of the reinforcement insert 112 could have its bent sections spaced closer together than at the end portions. This is best shown in FIGS. 22 and 25.

FIGS. 26–31 illustrate a further practice of this invention. As shown therein the reinforcement insert 114 or trilaminate is mounted in the channel of a front rail 116 of an automotive vehicle behind the front wheels and underneath the tow board. This trilaminate reinforcement insert 114 is in the form of a curved generally vertical wall 122 having flat sides and which runs in the area of maximum vertical concurvature in the side view on the bottom of rail 116, as shown in FIG. 26. In discrete sections or locations along the trilaminate length it would be desirable to install horizontal bulkheads 118 which are also in the form of trilaminates cut to fit the vertical wall 122. FIGS. 30–31, for example, show the vertical wall 122 to have a slot 117 and the bulkhead or horizontal wall 118 to have a slot 119. The vertical wall 122 and horizontal bulkhead 118 are thus joined together by engagement at the slots 117 and 119. Alternatively, the bulkheads 118 could be located by means of tabs that key into holes or slots 120 in the vertical walls 122 of the main component trilaminate insert 114 as shown, for example, in FIGS. 35–36. The horizontal bulkheads 18 would function to prevent lateral buckling of the rail section in a local area. The main vertical reinforcement 122 is used to prevent buckling in the rail vertical or side view direction. The horizontal bulkhead 118 forms a cross brace for the rail section when it is slipped into the vertical member 122.

The various components of reinforcement insert 114 may be custom shaped in accordance with the end use. For example, as illustrated the vertical member 122 may include an arcuate wall 115 which may be semi-cylindrical in shape to clear a pin located in the structural member so that the assembled rail components could be welded to each other.

The various figures also illustrate a clearance hole 121 in the bulkhead or horizontal member 118 for the fastener.

FIG. 29 best illustrates a practice of the invention where the thickness of the vertical member 122 varies from one end to the other. Thus, for example, the end on the left hand portion of FIG. 29 is twice as thick as the remote end on the right hand portion with the thickness uniformly tapering from one end to the other. The laminate 122 might thus be 8 mm thick at one end and 4 mm thick at the other end.

Figure 34:
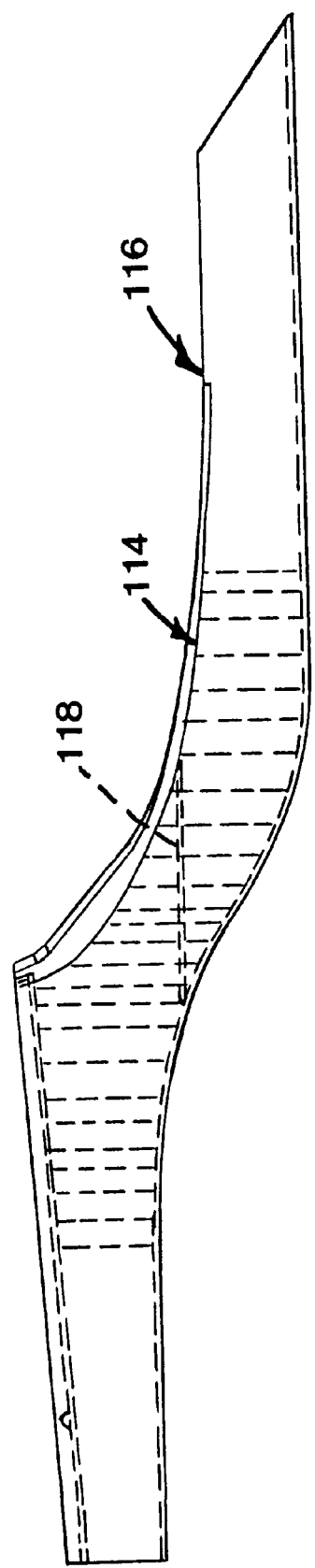
FIG. 34 is a side elevational view of the structure shown in FIGS. 32–33.
Figure 35:
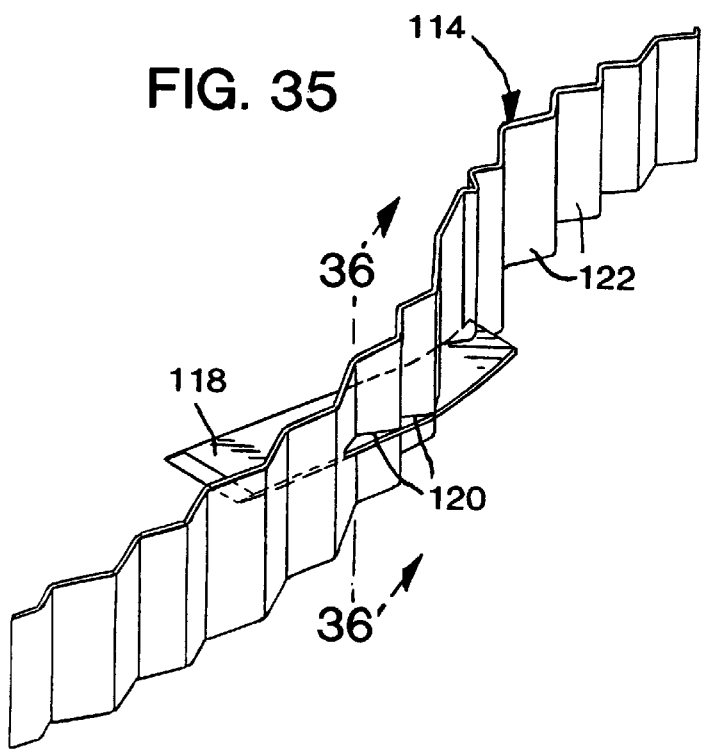
FIG. 35 is a perspective view of the reinforcement insert shown in FIGS. 32–34.
Figure 36:
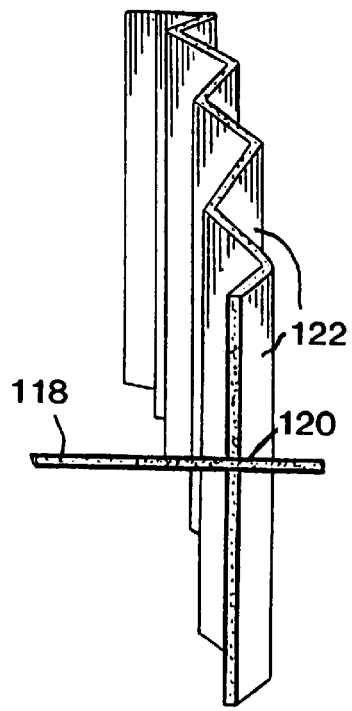
FIG. 36 is a cross-sectional view taken through FIG. 35 along the line 36—36.

FIGS. 32–36 illustrate a practice of the invention very similar to that of FIGS. 26–31 except that in FIGS. 32–36 the vertical member 122 is in the form of vertical pleats which run in the area of maximum vertical curvature in the side view of the bottom rail 116 as shown in FIG. 34. The main function of the convolutions of reinforcement insert 114 is to stabilize the vertical web from buckling in the lateral or horizontal direction. A vertical wall will buckle under a smaller compressive load than a wall that has a series of vertical stiffeners or convolutes. This also applies to the web trapped between the two horizontal bulkheads 118,118. At this location the convolutes act as miniarches to support the horizontal bulkheads and consequently the main rail section.

Figure 37:
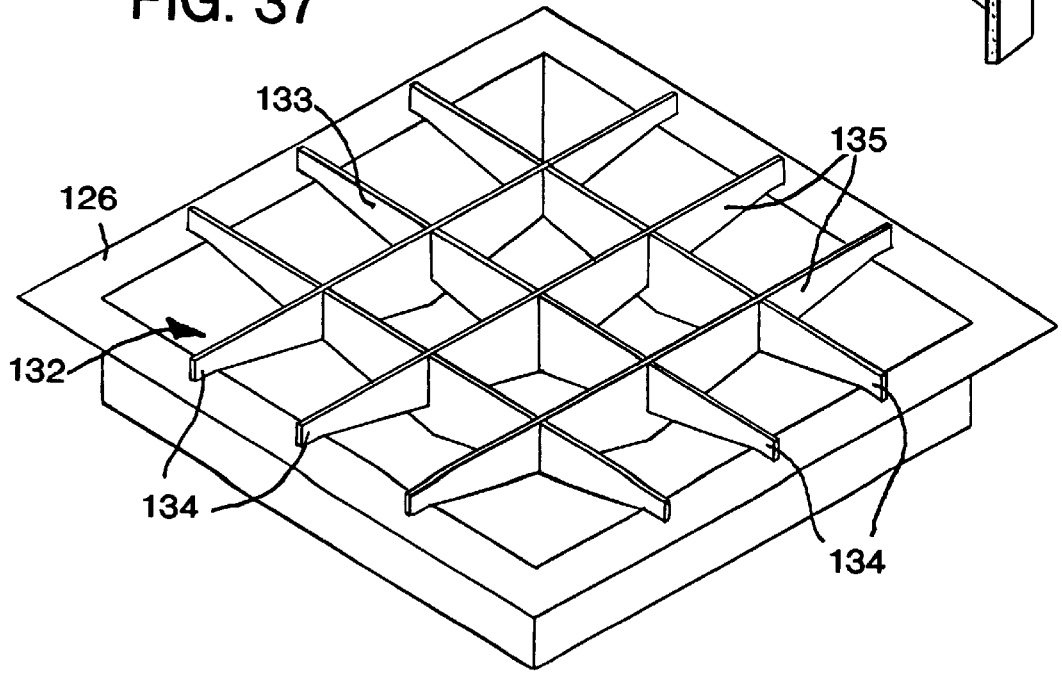
FIG. 37 is a perspective view showing a rein-forced structural member in accordance with yet another embodiment of this invention.
Figure 38:
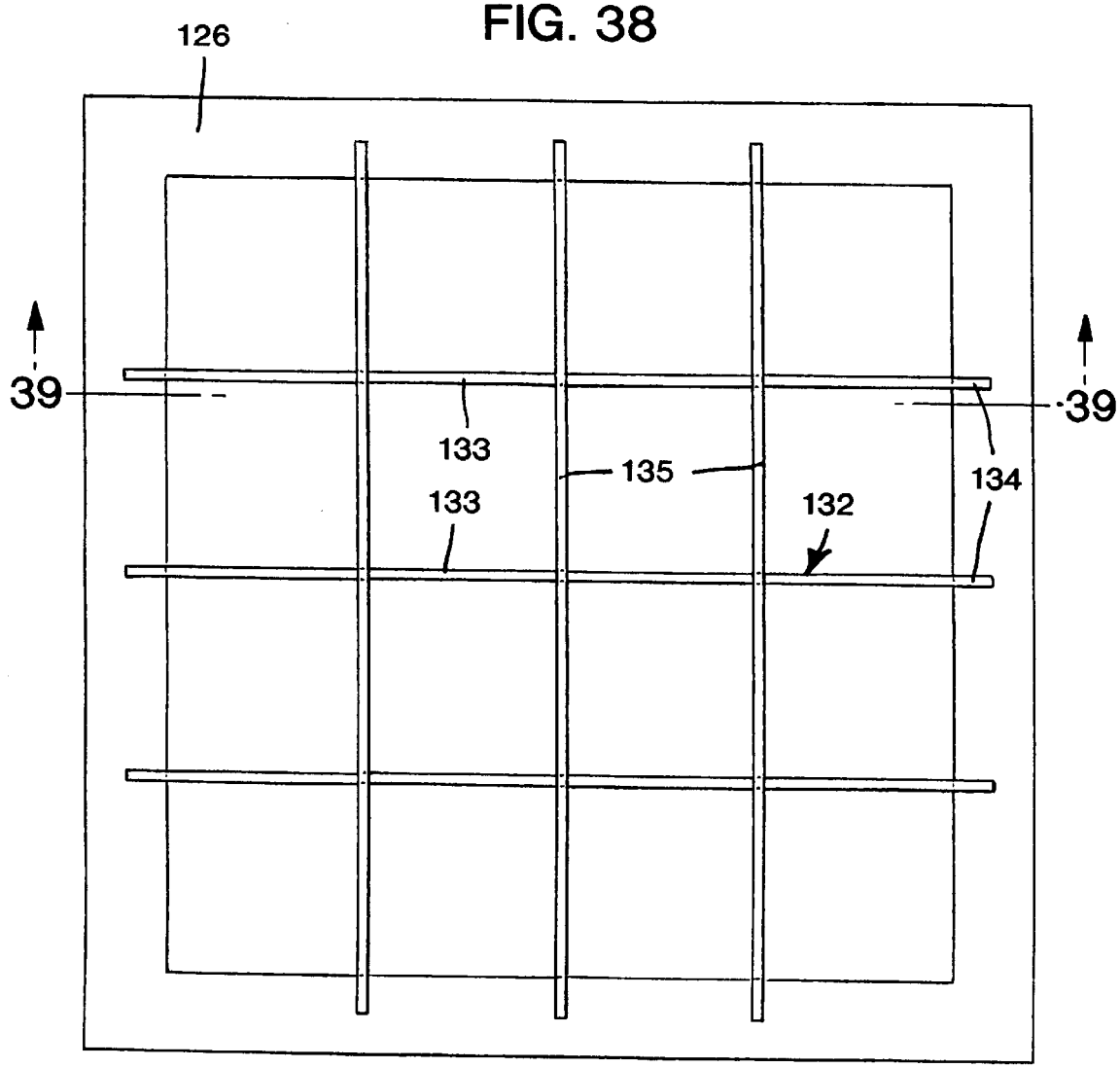
FIG. 38 is a top plan view of the structure shown in FIG. 37.
Figure 39:
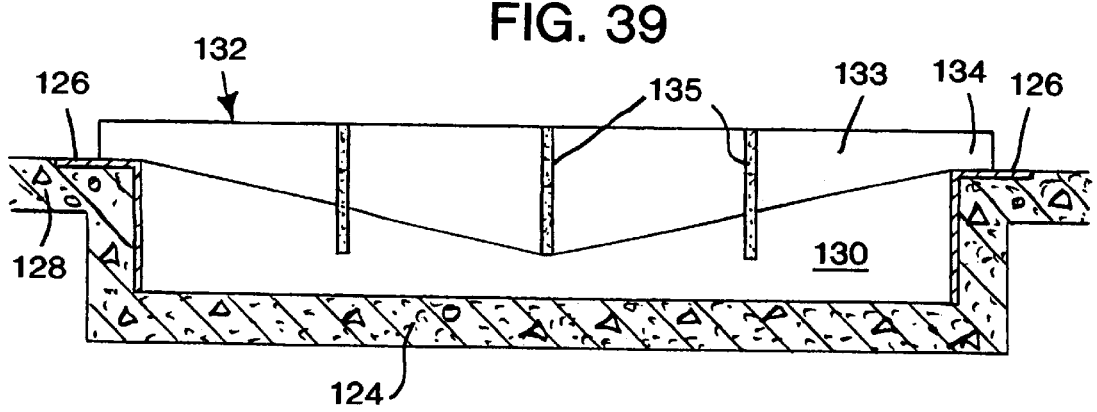
FIG. 39 is a cross-sectional view taken through FIG. 38 along the line 39—39.
Figure 41:
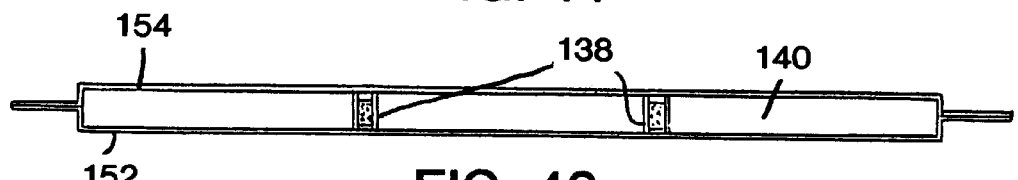
FIG. 41 is a top plan view of the structural member shown in FIG. 40.
Figure 40:
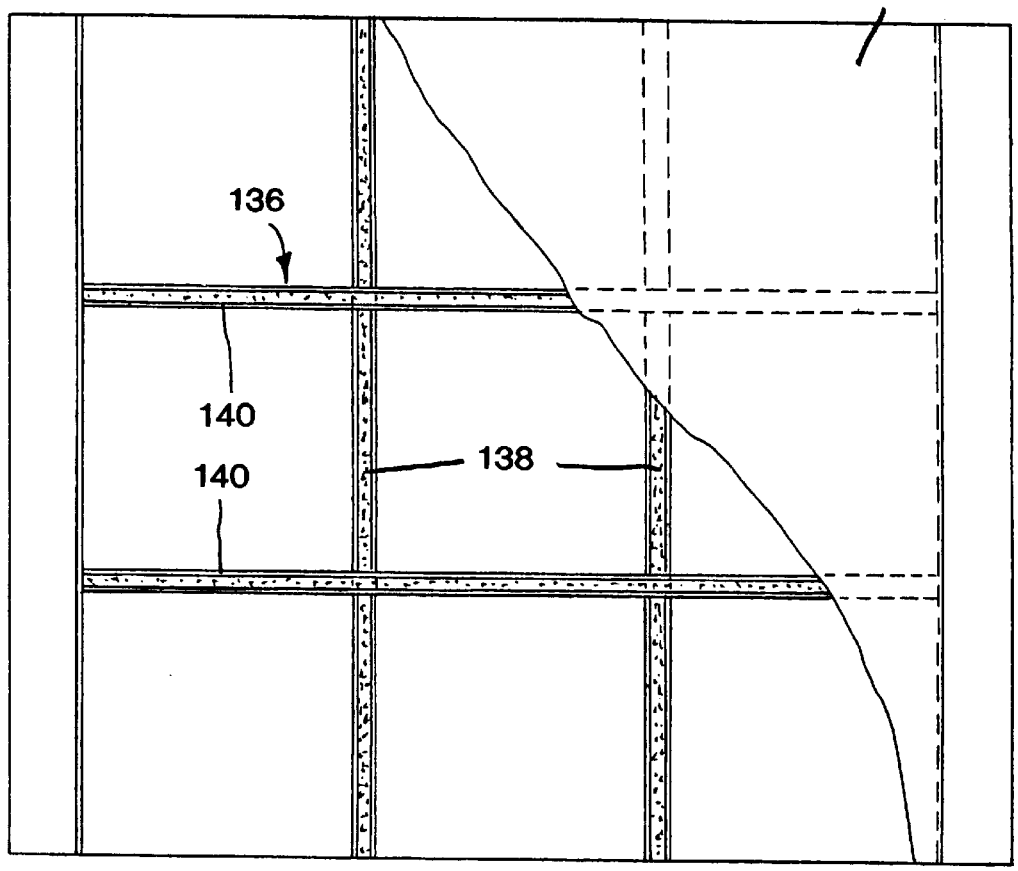
FIG. 40 is a side elevational view of a rein-forced structural member in accordance with yet another embodiment of this invention.
Figure 42:
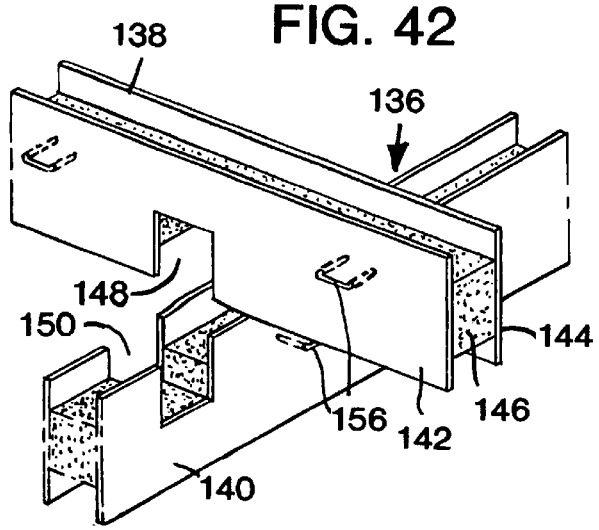
FIG. 42 is a fragmental perspective view showing a reinforcement insert in accordance with a further practice of this invention.

FIGS. 37–39 represent an application for non-automotive use in which a recessed floor 124 is capped with a piece of sheet metal 126 that is hemmed over the four perimeter flanges 128 around the recessed area to form a pan. This part may be used, for example, for computer room sub-floors to isolate computer equipment from cabling underneath. Thus, the pan 126 includes, in effect, creates a pit 130 in the recessed floor 124 to accommodate electrical wiring and cooling equipment. The assembled pans 126 are supported by a metal grillage and the pans are dropped into the grillage and hung from their flanges. The current method to reinforce the pans is to fill the pans with concrete, but this method yields a heavy part which is difficult to install and messy to fabricate. In accordance with the invention the concrete is replaced with a trilaminate partition 132 formed by interlocked supports 133,135 to form a grid. As best shown in FIGS. 37 and 39 supports 133 and 135 terminate in ends 134 having a horizontal lower surface for placement on horizontal pans 126. Inwardly of ends 134, each support 133,135 is downwardly inclined to the center of partition 132. This arrangement assures a self centering of partition 132 in pan 126 because the spacing between the opposite horizontal ends 134 from the points where the ends begin to taper would be equal to the spacing between opposite sides of pan 126. Additionally, the downward taper of supports 133,135 means that there is an increased amount of reinforcement into pit 130. Alternatively, each support 133,135 may have its ends 134 comprise flanges of otherwise rectangularly shaped supports, rather than tapered supports. FIG. 39 illustrates the supports to terminate a distance above floor 124. This spacing and the tapered lower edges of supports 133,135 assures providing sufficient room in pit 130 to accommodate wiring, etc. An alternative would be to form the minibeams into interlocking arches that are bearing on the bottom of the pit. Prior embodiments illustrate various manners of forming a partitioned reinforcement. Thus, the computer floor module 24 is effectively supported.

Figure 43:
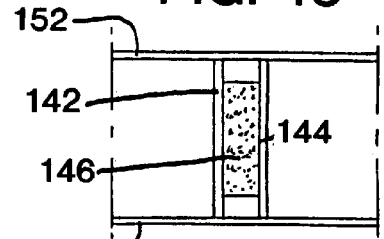
FIG. 43 is a fragmental top plan view showing the reinforcement insert of FIG. 42 mounted in a structural member before expansion of the foam.
Figure 44:
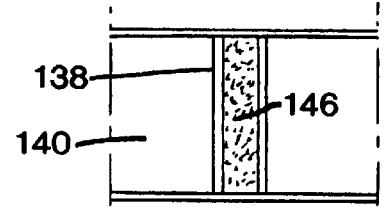
FIG. 44 is a view similar to FIG. 43 after expansion of the foam.

FIGS. 40–44 illustrate a variation of a stiffener 136 which is in lattice form comprising a plurality of first laminates 138 and a plurality of second laminates 140 extending cross wise to the laminates 138. Each laminate comprises a pair of outer support members 142,144 between which is sandwiched the polymer 146. Each laminate 138,140 is provided with a plurality of notches 148,150 so that the notches may mate with each other to create an interlocked structure forming the reinforcement 136. FIGS. 43–44 show the laminate structure between walls 152,154 of a member which is intended to be reinforced. FIG. 43 shows the arrangement before the polymer 46 has expanded, while FIG. 144 shows the polymer 146 expanded into a structural foam intimately bonded to each side wall 152,154.

In accordance with a further feature of this invention mechanical staples 156 are used to keep the trilaminate structure together and allow the polymer 146 to expand in the plane of the laminate in order to tie the two opposing sides 142,144 together and ultimately to tie the sides 152, 154 together. The staples keep the metal sides 142,144 from bulging and moving laterally and force the polymer expansion to the opposing walls 152,154 that are to be reinforced and tied together.

Figure 45:
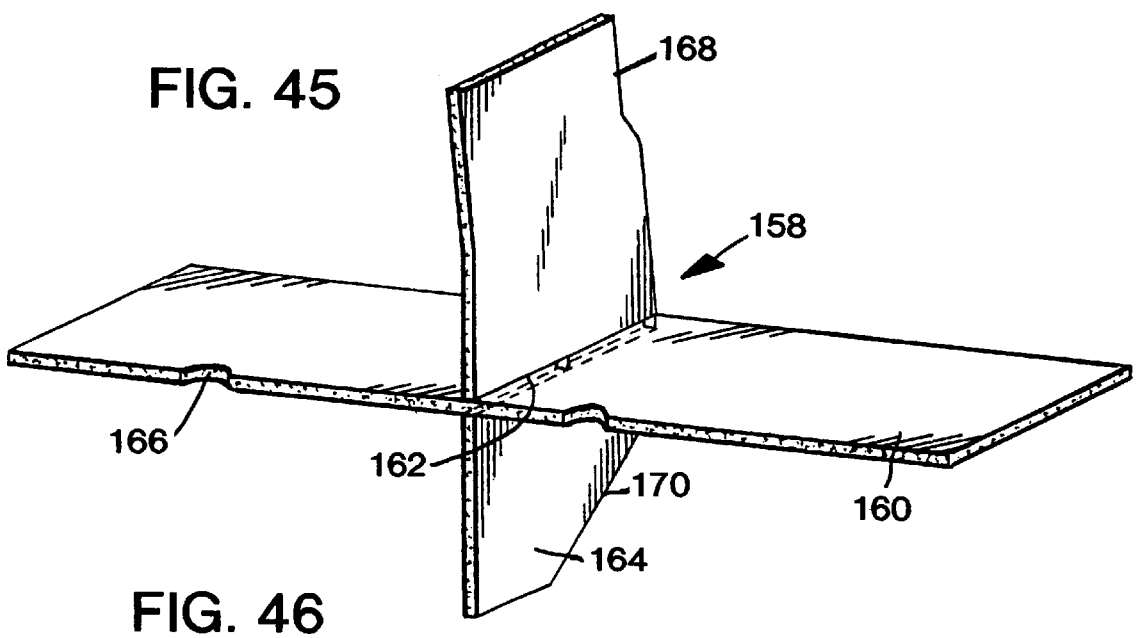
FIG. 45 is a perspective view of still yet another form of reinforcement insert in accordance with this invention.
Figure 46:
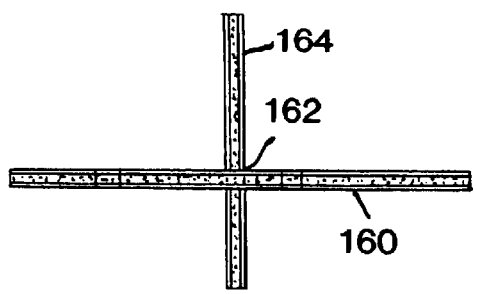
FIG. 46 is an end elevational view of the insert shown in FIG. 45.

FIGS. 45–46 show a further reinforcement insert 158 in accordance with another embodiment of this invention. Such insert might be used, for example, to reinforce the lower B pillar of an automobile. As shown therein, one trilaminate member 160 would slide into an elongated notch 162 of the perpendicular trilaminate member 164. If desired, surface interruptions, such as holes 166 or further notches 168 or tapers 170, may be provided on the laminate members to accommodate the shape of the structural member being reinforced.

Figure 47:
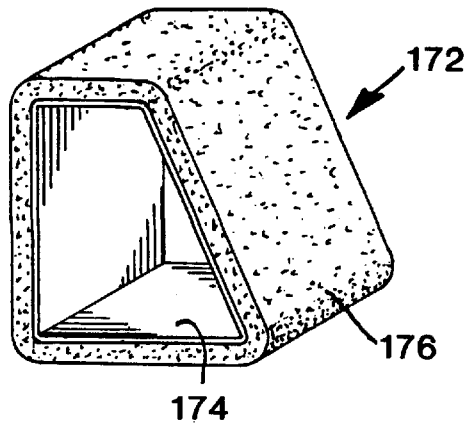
FIG. 47 is a perspective view of yet another form of reinforced structural member in accordance with this invention.

FIG. 47 shows yet another practice of this invention wherein the reinforcement insert 172 is in the form of a tube 174 completely peripherally wrapped with polymer 176. For example, the tube 174 could be of 0.8 mm cold rolled steel wrapped on all four sides with the polymer. The wrapped tube could then be inserted into an A pillar section and cured under E coat oven conditions. This form of laminate is a two-layer laminate rather than a trilaminate.

It has been proposed by others to reinforce an A pillar cross-section by means of an aluminum extrusion cross or plus sign tipped with an adhesive polymer. Such arrangement has various drawbacks when using this form of aluminum cross like structure. For example, the part has to be extruded in a straight section with the curvature being a secondary forming step. The cross would be very difficult to bend because it is not a tube and it could not hold its shape well and would distort. The part could not be extruded in a metal thickness less than 1.5 mm and most preferably 2.0 mm. The larger the section the more aluminum is required thus making this approach less competitive. In addition, in order to make the extrusion effective the webs, flats or walls of aluminum have to be normal or 90° to the wall or roof which they are bracing. Any off angle position would cause the reinforcement to slip from under their support. The polymer could not be strong enough to resist this underpinning failure. There would also be a problem with snaking a straight edge of the aluminum extrusion between holes. To clear holes the extrusion would have to be notched which results in additional cost. Since most of the automotive sections are never constant over their length additional edge polymer would have to be used to compensate for widening gaps. This could result in trimming the length of the part to fit or result in loss of reinforcing efficiency since the reinforcement could slip or rotate within in the main hollow cross section. Once the extrusion dies are set, part changes result in tool changes and loss of time, although aluminum dies are not expensive.

What is claimed is:

1. A stiffener for reinforcing a hollow structure having a pair of spaced walls, said stiffener comprising a laminate including a carrier member, a layer of expandable polymer on said carrier member, said laminate being of non-linear shape, said laminate including a cover member on said layer of expandable polymer, said non-linear shape being an upstanding U connected to an inverted U, said upstanding U having a pair of vertical legs and a horizontal connecting section, said inverted U having a pair of upstanding legs and a horizontal connecting section, one of said legs of said upstanding U being a leg common to said inverted U, the other of said legs of said upstanding U being an outward leg and the other of said legs of said inverted U being an outward leg, and one of said outward legs extending above the remaining of said legs and above said horizontal connecting sections.

2. The stiffener of claim 1 wherein said carrier member and said cover member are rigid.

3. The stiffener of claim 1 wherein the other of said outward legs terminates below the remaining of said legs and below said horizontal connecting sections, and said polymer being heat expandable.

4. The stiffener of claim 3 in combination with an automobile pillar having an elongated vertical portion connected at a junction to an elongated horizontal portion, and said stiffener being located at said junction.

* * * * *